United States Patent [19]

Frey et al.

[11] Patent Number: 4,964,876
[45] Date of Patent: Oct. 23, 1990

[54] BLUE ANTHRAQUINONE DISPERSE DYES AND MIXTURES OF BLUE DISPERSE DYES

[75] Inventors: Christian Frey, Muttenz; Bernd Dill, Rheinfelden; Konrad Schmid, Liestal, all of Switzerland

[73] Assignee: Ciba-Geigy Corporation, Ardsley, N.Y.

[21] Appl. No.: 353,587

[22] Filed: May 18, 1989

[30] Foreign Application Priority Data

May 24, 1988 [CH] Switzerland .......................... 1963/88

[51] Int. Cl.$^5$ .......................... C09B 1/51; C09B 67/22; D06P 1/20
[52] U.S. Cl. .......................... 8/643; 8/675; 8/679; 8/922; 552/247; 564/393; 564/394
[58] Field of Search .............................................. 8/643

[56] References Cited

U.S. PATENT DOCUMENTS

| | | | |
|---|---|---|---|
| 2,641,602 | 0/1954 | Straley et al. | 522/247 |
| 2,777,863 | 1/1957 | Dickey et al. | 552/246 |
| 3,440,000 | 4/1969 | Pizzarello et al. | 8/643 |
| 3,989,450 | 11/1976 | Hohmann et al. | 8/679 |
| 4,626,257 | 12/1986 | Matsuo et al. | 8/638 |

FOREIGN PATENT DOCUMENTS 716937 10/1954 United Kingdom .
1444716 8/1976 United Kingdom .
2017136 10/1979 United Kingdom .

*Primary Examiner*—A. Lionel Clingman
*Attorney, Agent, or Firm*—Kevin T. Mansfield; George R. Dohmann

[57] ABSTRACT

The dye mixture mentioned in claim 1 or one of the dyes mentioned in claims 12 or 13 are used for the dyeing of polyester textile material.

14 Claims, No Drawings

BLUE ANTHRAQUINONE DISPERSE DYES AND MIXTURES OF BLUE DISPERSE DYES

The present invention relates to blue disperse dyes, mixtures of blue disperse dyes, processes for their preparation, dye preparations containing these dye mixtures, and their use for the dyeing of textile material.

The dye mixtures according to the invention contain at least one dye of each of the following formulae

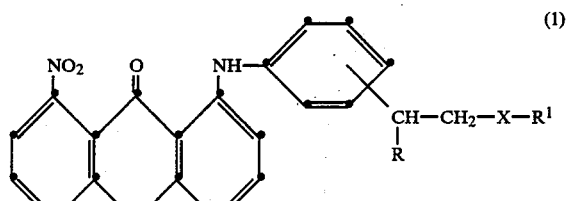

and

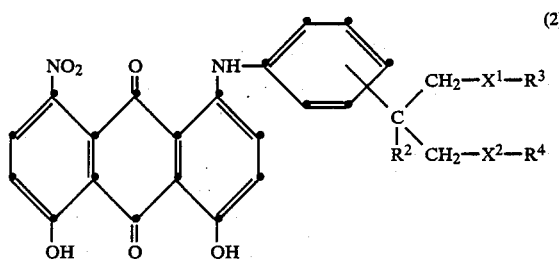

in which R and $R^2$, independently of one another, are each hydrogen or $C_1$-$C_4$ alkyl, $R^1$, $R^3$ and $R^4$, indePendently of one another, are each hydrogen or $C_1$-$C_8$ alkyl and X, $X^1$ and $X^2$, independently of one another, are each O or S.

Suitable alkyl groups R and R are methyl, ethyl, n-propyl, iso-propyl, n-, sec-, tert- or iso-butyl.

Preferably, R and $R^2$, independently of one another, are methyl or hydrogen, in particular hydrogen.

Alkyl groups $R^1$, $R^3$ and $R^4$ are understood to mean straight-chain or branched or cyclic alkyl groups having 1 to 8 carbon atoms. Examples are methyl, ethyl, propyl, i-propyl, butyl, i-butyl, tert-butyl, amyl, tert-amyl (1,1-dimethylpropyl), 1,1,3,3-tetramethylbutyl, hexyl, 1-methylpentyl, neopentyl, 1-, 2- or 3-methylhexyl, heptyl, n-octyl, tert-octyl, 2-ethylhexyl, cyclopentyl, cyclohexyl, methylcyclohexyl and the corresponding isomers.

These alkyl radicals can be substituted, for example by hydroxyl, alkoxy having 1 to 4 carbon atoms, especially methoxy, halogen, such as bromine or chlorine, cyano or phenyl.

Preferably, $R^1$, $R^3$ and $R^4$, independently of one another, are each methyl, ethyl or hydrogen, in particular hydrogen.

The preferred meaning of X, $X^1$ and $X^2$ is in each case oxygen.

Preferred dye mixtures according to the invention contain
(a) 50–90 % by weight of at least one dye of the formula (1),
(b) 5–50 % by weight of at least one dye of the formula (2) and
(c) 0–30 % by weight of one or more further dyes of the 1,8-dihydroxy-4-nitroanthraquinone series.

Of these, those dye mixtures are particularly preferred which contain
(a) 55–80 % by weight of at least one dye of the formula (1),
(b) 10–30 % by weight of at least one dye of the formula (2) and
(c) 0 to 25 % by weight of one or more further dyes of the 1,8-dihydroxy-4-nitroanthraquinone series.

By virtue of their good coloristic properties and their easy preparation, dye mixtures containing
(a) 55–80 % by weight of the dye of the formula

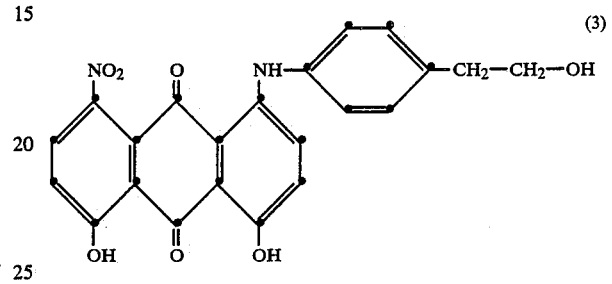

(b) 10–30 % by weight of one or more further dyes of the formula

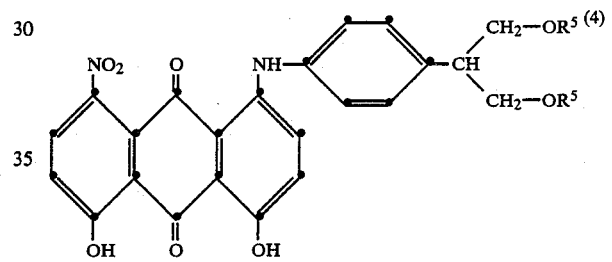

in which $R^5$ is hydrogen or methyl, and
(c) 0–25 % by weight of one or more further dyes of the 1,8-dihydroxy-4-nitroanthraquinone series are very particularly preferred.

Examples of components c) are 1,8-dihydroxy-4-nitro-5-aminoanthraquinone or 1,8-dihydroxy-4-nitro-5-(p-methyl)phenylaminoanthraquinone.

The dye mixtures according to the invention are obtained, for example, by mixing at least one dye of the formula (1) and at least one dye of the formula (2) with one another. Advantageously, dispersants, for example those of the anionic or nonanionic type, and water are additionally added to the mixture and the mixture is milled by means of milling assistants (for example glass beads or quartz sand) to give a ready-to-use dispersion.

However, the preferred process for the preparation of the dye mixtures according to the invention consists in reacting 1,8-dihydroxy-4,5-dinitroanthraquinone

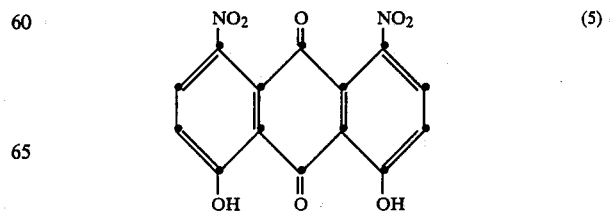

with a mixture of at least one amine of the formula

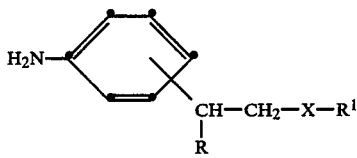

(6)

and at least one amine of the formula

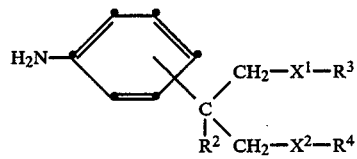

(7)

in which R, $R^1$, $R^2$, $R^3$, $R^4$, X, $X^1$ and $X^2$ are as defined in formula (2).

Amines of the formulae (6) and (7) are preferably those in which each of the side chains is in the p-position relative to the amino group.

The compounds of the formulae (5), (6) and (7) are known.

The compounds of the formulae (6) and (7) are prepared, for example, by reacting a nitroalkylbenzene of the formula

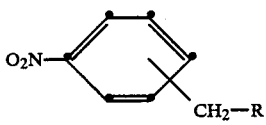

(8)

in which R is hydrogen or $C_1$–$C_4$alkyl with formaldehyde or thioformaldehyde (or compounds which eliminate these aldehydes) and reducing the nitro group in the reaction mixture obtained to the amino group and, if appropriate, alkylating the terminal OH or SH group.

The reaction conditions for the reaction of the compounds of the formula (8) with the aldehyde correspond, for example, to those listed in Swiss Patent Specification No. 500,938. The reduction of the nitro to the amino group is also carried out under known customary reaction conditions.

In this manner, mixtures of the amines of the formulae (6) and (7) are obtained, and these mixtures are preferably reacted with the 1,8-di-hydroxy-4,5-dinitroanthraquinone without separation.

This reaction takes place under conditions known per se, for example in an organic solvent at a temperature between 100° and 150° C. over a period of 5 to 10 hours. The dye mixtures obtained are subsequently isolated as usual, for example by pouring the reaction mixture at about 0° to 10° C. into dilute acid and filtering off the precipitated dye mixture.

The dye mixtures according to the invention are used for the dyeing and printing of textile materials which can be dyed with disperse dyes. Before their use, the dye mixtures are advantageously converted into dye preparations. This can be done by comminution, until the particle size is on average between 0.01 and 10 pm. The comminution can take place in the presence of dispersants.

Suitable anionic dispersants are, for example, condensation products from naphthalenesulfonic acids and formaldehyde, especially dinaphthalene-methanedisulfonates or modified ligninsulfonates. Suitable nonionic dispersants are, for example, addition products of about 3 to 40 mol of ethylene oxide with alkylphenols, fatty alcohols or fatty amines.

For example, the dried dye mixture is milled with a dispersant or kneaded in paste form with a dispersant and then dried in vacuo or by spraying. The preparations thus obtained can be used, after the addition of water, for dyeing, padding or printing from long liquor (liquor ratio greater than 5:1) or short liquor (liquor ratio 1:1 to 5:1).

The dye preparations preferably contain (a) 40–80 % by weight of a dye mixture according to the invention,
(b) 30–70 % by weight of a dispersant and
(c) 0–30 % by weight of other conventional additives.

Examples of other conventional additives which can be used are standardizing agents, salts, buffer substances, agents which prevent the dust formation of the dry preparations and/or the foaming of the aqueous dispersions.

The novel dye mixtures have excellent exhaustion properties from aqueous dispersions on textile materials made of fully synthetic or semi-synthetic high molecular weight substances. They are particularly suitable for dyeing, padding or printing fibers, threads or nonwovens, wovens or knitted fabrics, especially fibers made of linear aromatic polyesters. These are in general polycondensation products from terephthalic acid and glycols, in particular ethylene glycol, or polycondensation products from terephthalic acid and 1,4-bis(hydroxymethyl)hexahydrobenzene.

The polyester fibers are dyed, for example, by processes known per se in the presence of carriers at temperatures between about 80° and 125° C., or in the absence of carriers under pressure at about 100 to 140° C. by the exhaust process. Furthermore, these fibers can be padded or printed with the aqueous dispersions of the dye mixtures and the impregnation obtained can be fixed at about 140° to 230° C., for example by means of steam, contact heat or hot air.

In most cases, the conventional, already mentioned dispersants, which are preferably anionic or nonionic and can also be used in a mixture with one another, are added.

For the padding and printing, conventional thickening agents can be used, for example modified or unmodified natural products, for example alginates, British gum, gum arabic, crystal gum, locust bean gum, gum tragacanth, carboxymethylcellulose, hydroxyethylcellulose, starch or synthetic products, for example polyacrylamides or polyvinyl alcohols.

Some of the dyes contained in the dye mixtures according to the invention are known, for example those of the formulae (1) and (2) in which R, $R^1$, $R^2$, $R^3$ and $R^4$ are each H and X, $X^1$ and $X^2$ are each O, from British Patent Specification No. 716,937 and U.S. Patent Specification No. 2,641,602. These dyes are obtained by condensation of 1,8-dihydroxy-4,5-dinitroanthraquinone with 4-(2-hydroxyethyl)aniline or 4-(1,3-dihydroxyisopropyl)aniline. However, the preparation of these dyes is very complicated, since both anilines mentioned can be prepared in pure form only at great expense and effort. The reason is that their synthesis is carried out by nitration and reduction of the corresponding hydroxyalkylbenzenes in acetic acid or acetic anhydride, in which the nitration requires considerable safety precautions due to the risk of explosion.

In contrast, the dye mixtures according to the invention can be prepared by using a mixture of the corresponding amines, which are obtained with no difficulties by reaction of nitroalkylbenzene with aldehyde, followed by reduction. The nitration of the alkylbenzenes can be carried out in such a manner that no safety risk is involved.

Surprisingly, the mixtures of the amines of the formula (6) and (7) can be reacted without separation with 1,8-dihydroxy-4,5-dinitroanthraquinone to give the dye mixtures according to the invention, which produce, on textile material, for example made of polyester, blue dyeings, which are in particular distinguished by purity, good build-up properties and good fastness properties, especially sublimation and lightfastness.

The dyes of the formulae

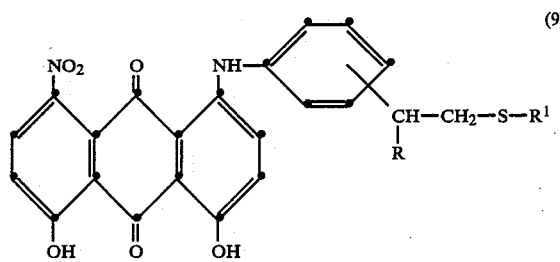

(9)

and

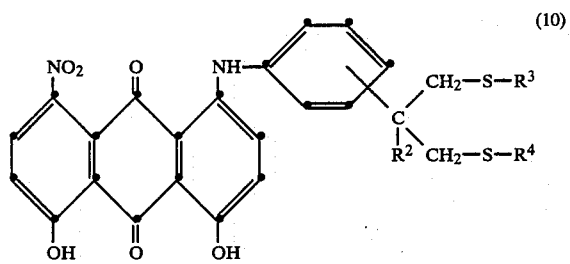

(10)

in which R and $R^2$, independently of one another, are each hydrogen or $C_1$–$C_4$alkyl and $R^1$, $R^3$ and $R^4$, independently of one another, are each hydrogen or $C_1$–$C_8$alkyl are novel and are also provided by the present invention.

Other novel dyes are those of the formulae

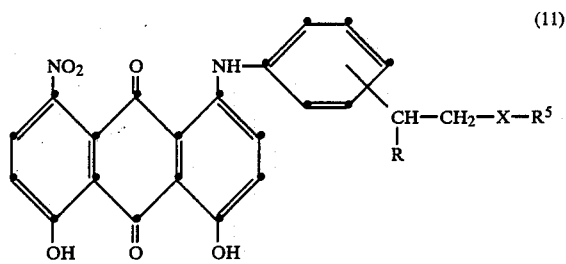

(11)

and

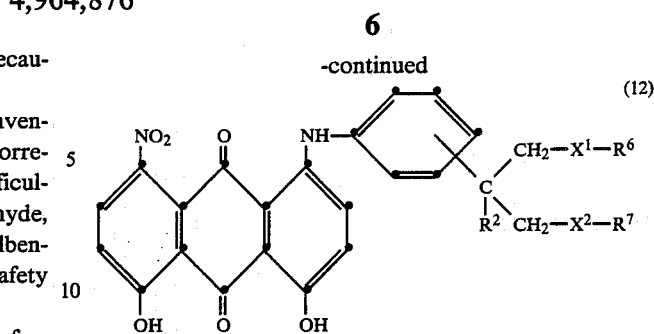

(12)

in which R and $R^2$, independently of one another, are each hydrogen or $C_1$–$C_4$alkyl, $R^5$, $R^6$ and $R^7$, independently of one another, are each $C_1$–$C_8$alkyl and X, $X^1$ and $X^2$, independently of one another, are each O or S.

The dyes of the formulae (11) and (12) are also provided by the present invention.

The dyes of the formulae (9) to (12) are prepared analogously to the dye mixtures according to the invention which contain a dye of the formulae (1) and (2) by reacting 1,8-dihydroxy-4,5-dinitroanthraquinone with an amine of the formula

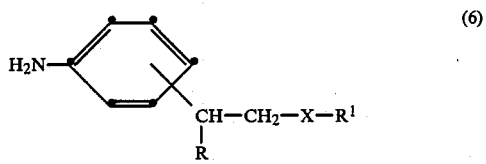

(6)

or an amine of the formula

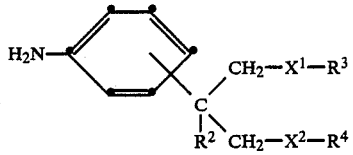

(13)

in which R, $R^1$, $R^2$, $R^3$, X, $X^1$ and $X^2$ are as defined in formula (2).

The use of the dyes of the formulae (9) to (12) is analogous to the use of the dye mixtures according to the invention.

In the examples which follow, the percentages are by weight, unless stated otherwise. The temperatures are in degrees Celsius.

EXAMPLE 1

A mixture of 19.4 g of 1,8-dihydroxy-4,5-dinitroanthraquinone, 25.0 g of a mixture consisting of about 72 % of 2-(4-aminophenyl)-ethanol, about 22 % of 2-(4-aminophenyl)propane-1,3-diol, about 3 % of 4-toluidine and by-products, and 140 g of diethylene glycol monomethyl ether is heated to 130° C. over a period of 2.5 hours. Stirring at 130–135° C. is continued for 6 hours, during which the water of the reaction is separated off by distillation. The reaction mixture is cooled to 100° C. and stirred into a mixture of 250 g of water, 250 g of ice and 110 g of 32 % hydrochloric acid. This crude dye suspension is filtered at about 20° C., and the product is washed with about 3 liters of water. After drying, 27 g of a dye mixture containing 65 % of the dye of the formula

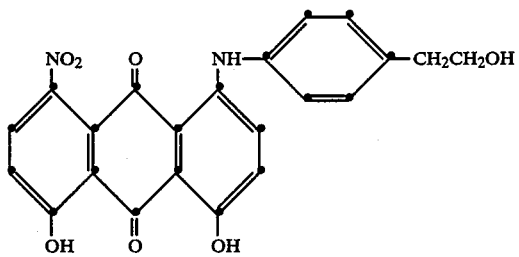

13 % of the dye of the formula

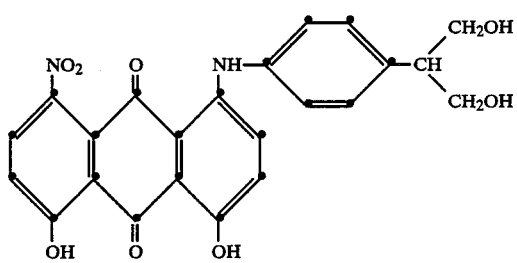

3 % of the dye of the formula

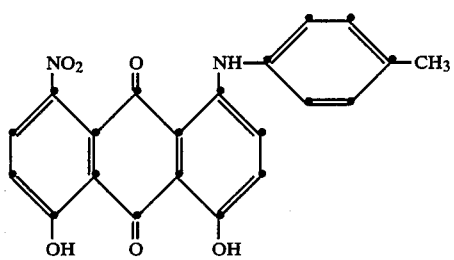

7% of 1,8-dihydroxy-4-nitro-5-aminoanthraquinone, and 2-phenylpropane-1,3-diol and phenylethanol is obtained.

EXAMPLE 2

A mixture of 90.2 g of 1,8-dihydroxy-4,5-dinitroanthraquinone, 145.3 g of crude amine consisting of about 65 % of 4-(4-aminophenyl)-2,6-dioxaheptane, about 10 % of 4-(4-aminophenyl)-2-oxabutane, about 7 % of 2-(4-aminophenyl)ethanol, about 2 % of 2-(4-aminophenyl)propane-1,3-diol, about 2 % of 4-aminotoluene, about 14 % of by-products (including methoxy derivatives of 2-(4-aminophenyl)-t-butanetriol), and 840 g of diethylene glycol monomethyl ether is heated to 133° C. over a period of 1¼ hour.

Stirring at 130–135° C. is continued for 6 hours, during which the water of the reaction is separated off by distillation. The reaction mixture is cooled to 100° C. and stirred into a mixture of 1250 g of water, 1250 g of ice and 550 g of 32 % hydrochloric acid. This crude dye suspension is filtered at about 20° C., and the product is washed with about 3 l of water. The moist presscake (about 300 g, corresponding to about 140 g of dry crude dye) is dispersed and spray-dried together with a ligninsulfonate dispersant such that the dye powder obtained contains about 25 % of crude dye and about 70 % of dispersant. This powder dyes polyester fibers in lightfast blue hues.

EXAMPLE 3

A mixture of 19.4 g of 1,8-dihydroxy-4,5-dinitroanthraquinone, 25.0 g of crude amine consisting of about 78 % of 2-(4-aminophenyl)thioethanol, about 17 % of 2-(4-aminophenyl)propane-1,3-dithiol, about 3 % of 4-toluidine and by-products, and 140 g of diethylene glycol monomethyl ether is heated to 130° C. in a nitrogen stream over a period of 2.5 hours. Stirring at 130°–135° C. is continued for 6 hours, during which the water of the reaction is separated off by distillation. The reaction mixture is cooled to 100° C. and stirred into a mixture of 250 g of water, 250 g of ice and 110 g of 32 % hydrochloric acid.

This crude dye suspension is filtered at about 20° C., and the product is washed with about 3 l of water. This gives about 86 g of a moist press-cake containing about 27 g of dry crude dye.

The dry crude dye contains the dyes of the formulae

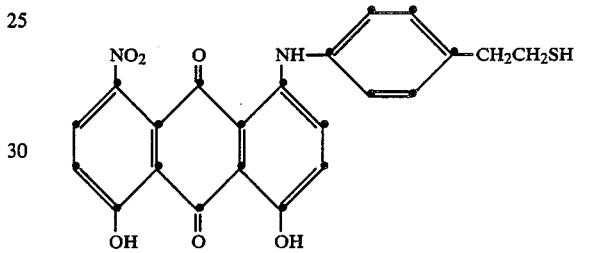

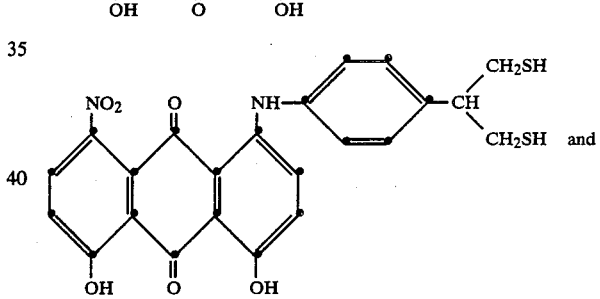

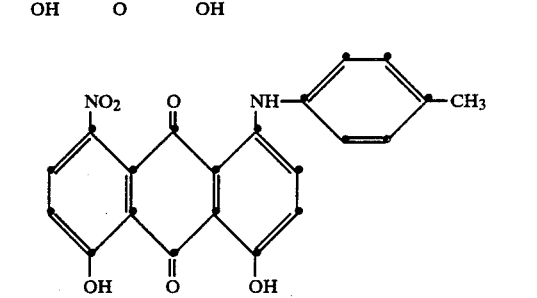

approximately in a ratio of 81:15:4.

This crude dye mixture is dispersed together with a ligninsulfonate dispersant and spray-dried such that the dye powder obtained contains about 25 % of crude dye and about 70 % of dispersant. This powder dyes polyester fibers in lightfast blue hues.

EXAMPLE 4

The procedure described in Example 1 is repeated, except that an equivalent amount of a mixture consisting of the amines of the formula

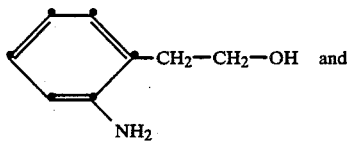

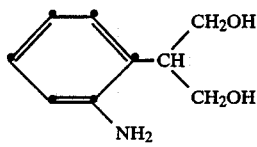

in a ratio of 65:13 is used instead of the amine mixture used there, to give a mixture of the dyes of the formulae

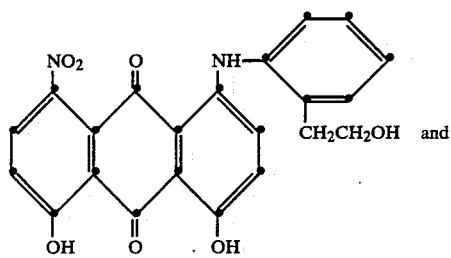

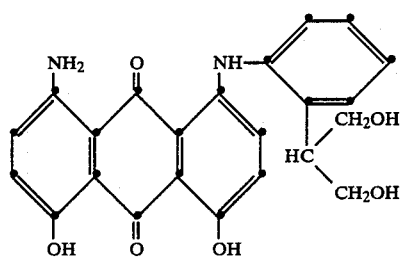

This mixture dyes polyester fibers in lightfast blue hues.

EXAMPLE 5

The procedure as described in Example 1 is repeated, except that an equivalent amount of 4-(4-aminophenyl)-2-oxabutane is used instead of the amine mixture used there, to give the dye of the formula

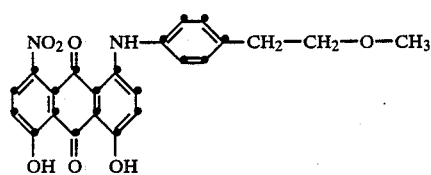

which dyes polyester fibers in lightfast blue hues.

EXAMPLE 6

The procedure as described in Example 1 is repeated, except that an equivalent amount of 2-(4-aminophenyl)-thioethanol is used instead of the amine mixture used there, to give the dye of the formula

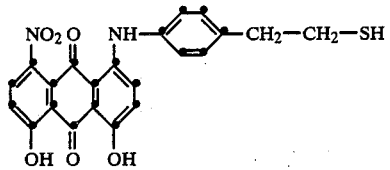

which dyes polyester fibers in lightfast blue hues.

EXAMPLE 7

1 part of the dye mixture obtained according to Example 1 and 3 parts of a ligninsulfonate dispersant were milled in water in a conventional manner and then spray-dried.

This gives a dye preparation in powder form.

EXAMPLE 8

2 parts of the dye preparation obtained according to Example 7 are dispersed in 4000 parts of water containing 12 parts of the sodium salt of o-phenylphenol, 2 parts of ammonium sulfate and 2 parts of the sodium salt of dinaphthylmethanedisulfonic acid. 100 parts of polyethylene glycol terephthalate yarn are then dyed in this liquor at 95 to 98° for 90 minutes.

The dyeing is then rinsed and after-treated with aqueous sodium hydroxide solution and a dispersant. In this manner, a lightfast and sublimation fast blue dyeing is obtained.

EXAMPLE 9

1 part of the dye mixture obtained according to Example 1 is milled with 2 parts of a 50 % aqueous solution of the sodium salt of dinaphthylmethanedisulfonic acid while wet and dried.

This dye preparation is stirred with 40 parts of a 10 % aqueous solution of the sodium salt of N-benzylheptadecylbenzimidazoledisulfonic acid, and 4 parts of a 40 % acetic acid solution are added. This gives a dyebath of 4000 parts by dilution with water.

This bath is entered at 50° with 100 parts of a polyester fiber material, the temperature is increased to 120° to 130° within half an hour, and the material is dyed in a closed vessel at this temperature for one hour. It is then thoroughly rinsed. This gives a blue dyeing having good fastness properties, especially good sublimation and lightfastness.

What is claimed is:

1. A dye mixture containing at least one dye of each of the following formulae

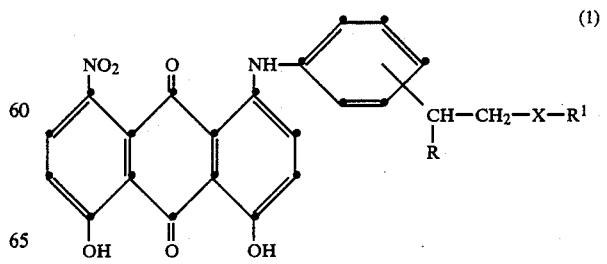

and

-continued

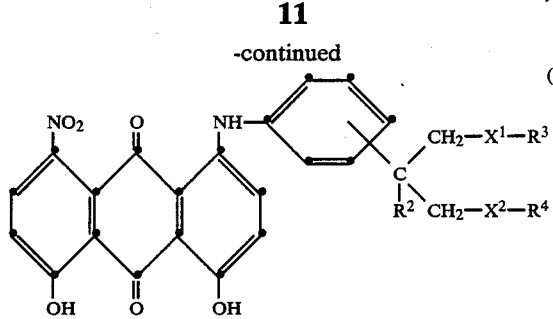

in which R and $R^2$, independently of one another, are each hydrogen or $C_1$-$C_4$alkyl, $R^1$, $R^3$ and $R^4$, independently of one another, are each hydrogen or $C_1$-$C_8$alkyl and X, $X^1$ and $X^2$, independently of one another, are each O or S.

2. A dye mixture according to claim 1, containing
(a) 50–90 % by weight of at least one dye of the formula (1),
(b) 5–50 % by weight of at least one dye of the formula (2) and
(c) 0–30 % by weight of one or more further dyes of the 1,8-dihydroxy-4-nitroanthraquinone series.

3. A dye mixture according to claim 2, containing
(a) 55–80 % by weight of at least one dye of the formula (1),
(b) 10–30 % by weight of at least one dye of the formula (2) and
(c) 0 to 25 % by weight of one or more further dyes of the 1,8-dihydroxy-4-nitroanthraquinone series.

4. A dye mixture according to claim 1, which contains only one dye of the formula (1) and one dye of the formula (2).

5. A dye mixture according to claim 1, wherein X, $X^1$ and $X^2$ are each oxygen.

6. A dye mixture according to claim 1, wherein R and $R^2$ are each methyl or hydrogen.

7. A dye mixture according to claim 1, wherein $R^1$, $R^3$ and $R^4$ are each methyl, ethyl or hydrogen.

8. A dye mixture of claim 6 wherein R and $R^2$ are each hydrogen.

9. A dye mixture of claim 7 wherein $R^1$, $R^3$ and $R^4$ are each hydrogen.

10. A dye mixture according to claim 1, containing
(a) 55–80% by weight of the dye of the formula

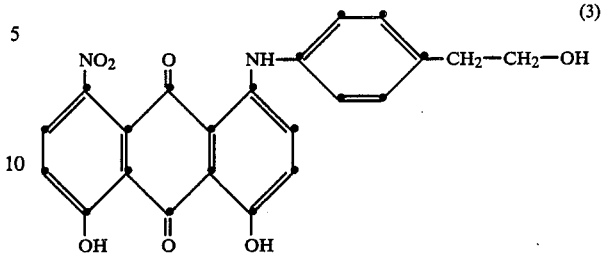

(b) 10–30 % by weight of one or more dyes of the formula

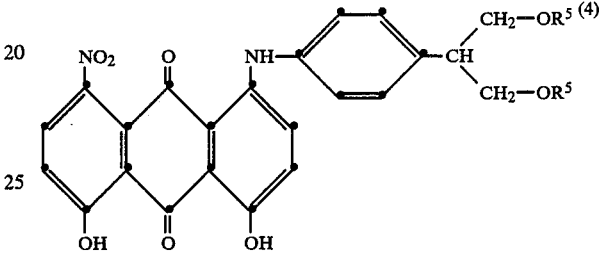

in which $R^5$ is hydrogen or methyl, and
(c) 0–25 % by weight of one or more further dyes of the 1,8-dihydroxy-4-nitroanthraquinone series.

11. A disperse dye preparation consisting of
(a) 40 to 80 % by weight of a dye mixture according to any one of claims 1 to 8,
(b) 30 to 70 % by weight of a dispersant and
(c) 0 to 30% by weight of other conventional additives.

12. The textile material dyed by using dye mixtures according to claim 1.

13. A method of dyeing textile material which comprises the step of applying a dye mixture of claim 1 to the textile material.

14. A method of claim 13 wherein the textile material is made of aromatic polyesters.

* * * * *